(12) United States Patent
Takano et al.

(10) Patent No.: US 8,349,490 B2
(45) Date of Patent: Jan. 8, 2013

(54) ELECTRODE FOR NONAQUEOUS ELECTROLYTE SECONDARY BATTERY SHOWING SMALL VARIABILITY IN BATTERY PROPERTIES AND NONAQUEOUS ELECTROLYTE SECONDARY BATTERY USING THE SAME

(75) Inventors: Fumio Takano, Kanagawa-ken (JP); Yasuhiro Wakizaka, Yokohama (JP)

(73) Assignee: Zeon Corporation, Tokyo (JP)

( * ) Notice: Subject to any disclaimer, the term of this patent is extended or adjusted under 35 U.S.C. 154(b) by 413 days.

(21) Appl. No.: 12/440,702

(22) PCT Filed: Sep. 11, 2007

(86) PCT No.: PCT/JP2007/067644
§ 371 (c)(1),
(2), (4) Date: Mar. 10, 2009

(87) PCT Pub. No.: WO2008/032699
PCT Pub. Date: Mar. 20, 2008

(65) Prior Publication Data
US 2010/0040948 A1    Feb. 18, 2010

(30) Foreign Application Priority Data
Sep. 11, 2006   (JP) .................................. 2006-245002

(51) Int. Cl.
*H01M 4/60*   (2006.01)

(52) U.S. Cl. ......... 429/212; 429/215; 429/217; 429/233
(58) Field of Classification Search ............... 429/212, 429/217, 215, 209, 218.1, 233, 66; 252/182.1; 204/291, 286.1; 428/522
See application file for complete search history.

(56) References Cited

U.S. PATENT DOCUMENTS

2006/0127764 A1 *  6/2006  Chen et al. ................. 429/217

FOREIGN PATENT DOCUMENTS

| JP | 11-126603 A | 5/1999 |
|---|---|---|
| JP | 2000-58067 A | 2/2000 |
| JP | 2001-332265 A | 11/2001 |
| JP | 2002-25540 A | 1/2002 |
| JP | 2006-269386 | * 10/2006 |
| JP | 2006-278303 A | 10/2006 |
| JP | 2007-242374 A | 9/2007 |

* cited by examiner

*Primary Examiner* — Raymond Alejandro
(74) *Attorney, Agent, or Firm* — Birch, Stewart, Kolasch & Birch, LLP

(57) ABSTRACT

The present invention is directed to an electrode for a nonaqueous electrolyte secondary battery and a nonaqueous electrolyte secondary battery using the same. The nonaqueous electrolyte secondary battery electrode includes an electrode material mixture and a current collector. The electrode material mixture includes an active material and a polymer. The thickness change rate of the electrode material mixture is −3 to 10% when immersing in an electrolyte at 60° C. for 72 hours.

4 Claims, No Drawings

ELECTRODE FOR NONAQUEOUS ELECTROLYTE SECONDARY BATTERY SHOWING SMALL VARIABILITY IN BATTERY PROPERTIES AND NONAQUEOUS ELECTROLYTE SECONDARY BATTERY USING THE SAME

TECHNICAL FIELD

The present invention relates to an electrode for a nonaqueous electrolyte secondary battery, and a nonaqueous electrolyte secondary battery using the electrode.

BACKGROUND ART

Recently, a nonaqueous electrolyte secondary battery, such as a lithium ion secondary battery, has substituted for a conventional secondary battery, such as lead secondary battery, nickel cadmium secondary battery and nickel hydride secondary battery, and plays the principle role in a small secondary battery for electronics due to its high power density. Then, it is further expected to develop for a motive power secondary battery for automobile, etc., and higher power density is required. Consequently, it has been investigated for highly filling an active material into an electrode, thick-walling of an electrode material mixture, and thin-walling of a separator and a power collector, etc., so that the capacity per cell has been increased.

The nonaqueous electrolyte secondary battery may be used in a cell in mobile phone, etc., and in multiple cells in laptop computer, engine for automobile and the like. When properties (hereinafter referred to as "battery properties") such as charging capacity and discharging capacity between cells are varied in case of using in multiple cells, and as a result, a part of cells is subject to large charging load and discharging load to cause problems such as dramatically reduced lifetime. Especially, when the porosity of the electrode material mixture is lowered for highly filling an active material, this problem becomes prominent.

To solve such a problem, it is required to measure the battery properties after conditioning a battery by preliminarily repeating discharge and charge and to select uniform batteries.

Patent Document 1 discloses a process for conditioning a battery at high temperature after using specific additives into the battery. By applying the process, it is possible to shorten conditioning time, but it is insufficient to decrease variability in battery properties.

Also, Patent Document 2 discloses a method for preventing swollen electrode and lowered battery properties when leaving the battery at high temperature by increasing adhesiveness between a negative-electrode collector and a negative-electrode material mixture.

[Patent Document 1] The Japanese Unexamined Patent Publication 2001-52757 (the corresponding foreign patent publication: U.S. Pat. No. 6,268,080)

[Patent Document 2] The Japanese Unexamined Patent Publication 2005-25991

DISCLOSURE OF INVENTION

Problem to be Solved by the Invention

Purpose of the present invention is to provide an electrode giving a nonaqueous electrolyte secondary battery showing small variability in battery properties, and a nonaqueous electrolyte secondary battery using the same.

Means for Solving the Problem

The present inventors found, as a result of keen examinations for achieving the above purpose, when using an electrode for a nonaqueous electrolyte secondary battery comprising an electrode material mixture including an active material capable of reversibly inserting and releasing a lithium ion by discharge and charge (in the present invention, simply referred to as "active material") and a polymer, and a collector, wherein a change rate of a thickness of the electrode material mixture after immersing in an electrolyte at 60° C. for 72 hours with regard to the thickness of the electrode material mixture before immersing in the electrolyte (hereinafter referred to as "thickness change rate") is −3% to 10%, it is possible to provide a nonaqueous electrolyte secondary battery showing small variability in battery properties. Then, it is found that measurements of a thickness change rate of a conventional electrode deviate from the above range. As a result of further keen examinations, the present inventors found that it is possible to provide an electrode having the thickness change rate within the range by using a polymer having specific stress relaxation rate, and came to completing the present invention based on the findings.

According to the first aspect of the present invention, there is provided an electrode for a nonaqueous electrolyte secondary battery comprising an electrode material mixture, including an active material and a polymer, and a collector, wherein a thickness change rate of the electrode material mixture is −3 to 10%.

It is preferable that a stress relaxation rate of said polymer indicated as a formula, $(1-\sigma_{10}/\sigma_0) \times 100(\%)$, is 50 to 80% where $\sigma_0$ indicates initial stress of a sheeted polymer at an elongation rate of 20%; and $\sigma_{10}$ indicates remaining stress after keeping elongation rate at 20% for 10 minutes.

Said polymer is preferably a soft polymer.

Said soft polymer is preferably a soft acrylic polymer.

Said soft polymer preferably includes at least one of a nitrile group or sulfo group.

Said electrode material mixture preferably includes said polymer in a range of 0.1 to 7 parts by mass per 100 parts by mass of the active material.

According to the second aspect of the present invention, there is provided a nonaqueous electrolyte secondary battery using said electrode for a nonaqueous electrolyte secondary battery.

Effects of the Invention

The present invention can provide an electrode giving a nonaqueous electrolyte secondary battery showing small variability in battery properties, and a nonaqueous electrolyte secondary battery using the same. The battery provided in the present invention can be preferably used as a small secondary battery for electronics, and a secondary battery for engine for automobile and the like.

BEST MODE FOR WORKING THE INVENTION

The electrode of the present invention comprises an electrode material mixture, including an active material and a polymer, and a collector, wherein the thickness change rate of the electrode material mixture is −3 to 10%, further preferably 0 to 8%.

(Thickness Change Rate of Electrode Material Mixture)

In the present invention, the thickness change rate of the electrode material mixture is measured in the following way.

The electrode is punched out in a disk with a diameter of 14±0.2 mm to make a test specimen. A thickness (t0) of a center portion of the test specimen is measured. Test specimen is horizontally immersed in an electrolyte, and left it at rest at 60±1° C. for 72±0.3 hours. The same electrolyte used for actually producing the battery can be used, and it is, for example, a solution obtained by dissolving LiPF6 in a concentration of 1 mol/L into a mixed solvent obtained by mixing ethylene carbonate (EC) and diethyl carbonate (DEC) in a volume ratio of EC:DEC=1:2 (where volumes of EC and DEC are those at 40° C. and at 20° C., respectively). After immersing, the test specimen is left in a horizontal position under an environment at a dew point of −54° C., at room temperature for 15 minutes, and then, a thickness (t1) of the center portion of this test specimen is measured. The thickness change rate is determined in a formula of (t1−t0)/t0×100.

The thickness change rate of the electrode material mixture can be maintained in an appropriate range by controlling the type of after-described active materials, and the molecular weight, degree of cross-linkage and crystallization degree of the polymer.

For example, when the polymer has high molecular weight, the thickness change rate of the electrode material mixture becomes small, and when the molecular weight is low, it becomes large. The preferable range of the weight-average molecular weight varies depending on its structure, crystallization degree, degree of cross-linkage, etc., and it is, for example, 1,000 to 1,000,000 in a standard polystyrene equivalent measured by gel permeation chromatography.

For controlling the thickness change rate of the electrode material mixture in the appropriate range, the degree of cross-linkage should not be either too low or too high, and is preferable to maintain within suitable range. The preferable range varies depending on its structure, crystallization degree, molecular weight, etc., and for example, it is preferably the degree of cross-linkage enough to dissolve or swell to 400% or more when immersing in the solvent for 24 hours. Also, when the polymer has high crystallization degree, the thickness change rate of the electrode material mixture becomes small. The preferable range varies depending on its structure, degree of cross-linkage, molecular weight, etc., and it is, for example, 40% or less, further preferably 20% or less, when measuring by X-ray diffraction method.

(Active Material)

The active material used in the present invention may be any one capable of reversibly inserting and releasing lithium ion by applying electric potential in the electrolyte, and either inorganic compound or organic compound can be used.

As an active material for the positive electrode, there can be illustrated a lithium-containing combined metal oxide such as $LiCoO_2$, $LiNiO_2$, $LiMnO_2$, $LiMn_2O_4$, $LiFeVO_4$ and $Li_xNi_y$-$Co_zMn_wO_2$ (where x+y+z+w=2); a salt of lithium-containing composite metal oxoacid salt such as $LiFePO_4$, $LiMnPO_4$ and $LiCOPO_4$; a transition metal sulfide such as $TiS_2$, $TiS_3$ and amorphous $MoS_3$; a transition metal oxide such as $Cu_2V_2O_3$, amorphous $V_2O$—$P_2O_5$, $MoO_3$, $V_2O_5$ and $V_6O_{13}$; and a compound wherein apart of transition metals in these compounds is substituted by other metals. Further, a conductive polymer such as polyacetylene and poly-p-phenylene can be used. Also, a compound, obtained by coating a part of or the entire surface of these compounds with carbon material and inorganic compound, etc., can be used.

Also, as an electrode active material for the negative electrode, for example, there may be mentioned a carbon material such as amorphous carbon, graphite, natural graphite, mesocarbon microbeads (MCMB) and pitch-based carbon fiber, and a conductive polymer such as polyacene. In addition, a metal capable of being alloyed with lithium, such as Si, Sn, Sb, Al, Zn and W, may be mentioned. The electrode active material wherein an electrical conducting material is attached to the surface by mechanical modification method can be used as well.

Among these, because it is easy to obtain high capacity, and is stable at high temperature, and it shows small change in volume as a result of insertion and release of lithium ion and is easy to decrease electrode thickness change rate, lithium-containing combined metal oxide and lithium-containing composite metal oxoacid salt are preferable as the positive electrode active material, and carbon material is preferable as the negative electrode active material.

The form of particle of the active material is preferably maintained in a spherical shape for suiting for high filling. Also, as regarding the particle size, a mixture of fine particles having a volume-average particle size of 0.8 µm to 2 µm and relatively-large particles having a volume-average particle size of 3 to 8 µm, and particles having abroad particle size distribution in a range of 0.5 to 8 µm are preferable. When including particles with a particle size of 50 µm or more, it is preferable to sift for removing these before use. Further preferably, the tap density of the electrode active material is 2 $g/cm^3$ or more for the positive electrode and 0.8 $g/cm^3$ or more for the negative electrode.

(Polymer)

The polymer used in the present invention is not particularly limited, and the stress relaxation rate, $(1-\sigma_{10}/\sigma_0) \times 100$ (%), of the sheeted polymer is preferably 50 to 80%, further preferably 55 to 70%.

(Stress Relaxation Rate)

In the present invention, the stress relaxation rate is measured in the following way.

20 parts by mass of the polymer is dissolved or dispersed in 100 parts by mass of a solvent. The solution or dispersion liquid is casted on a fluorine resin plate, and dried in a vacuum at 120° C. for 24 hours to obtain a sheeted polymer with a thickness of 1±0.1 mm. The sheeted polymer is punched out in a shape of dumbbell No. 3 prescribed in JIS K6251 to make a test specimen. The test specimen is pulled at 25° C. in the lengthy direction of the test specimen at a speed of 10 mm/minute, and as of attaining the elongation rate of 20%, the elongation is stopped to measure the initial stress $\sigma_0$. Then, the elongation rate is kept at 20% for 10 minutes, and the remaining stress $\sigma_{10}$ was measured, so that the stress relaxation rate, $(1-\sigma_{10}/\sigma_0) \times 100(\%)$, is obtained.

A method for maintaining the stress relaxation rate of the polymer within the above-mentioned range is not particularly limited, and for example, publicly-known methods may be used for controlling the molecular weight, degree of cross-linkage, crystallization degree, etc. When controlling the molecular weight, too high molecular weight causes to reduce the stress relaxation rate, and too low molecular weight causes to increase it. The preferable range of the weight-average molecular weight varies depending on its structure, crystallization degree, degree of cross-linkage, etc., and it is, for example, 1,000 to 1,000,000 in a standard polystyrene equivalent measured by gel permeation chromatography.

When controlling the degree of cross-linkage, it is necessary to adjust the degree of cross-linkage in a proper range. The preferable range varies depending on its structure, crystallization degree, molecular weight, etc., and for example, it is preferably the degree of cross-linkage enough to dissolve or swell to 400% or more when immersing in the solvent for 24 hours. When controlling the crystallization degree, high crystallization degree causes small stress relaxation rate. The preferable range varies depending on its structure, degree of cross-linkage, molecular weight, etc., and it is, for example, 40% or less, further preferably 20% or less, when measuring by X-ray diffraction method.

(Soft Polymer)

The polymer is preferably a soft polymer. In the present invention, the soft polymer indicates a polymer having a glass transition temperature of 30° C. or less measured by a differential scanning calorimetry. The glass transition temperature is further preferably 15° C. or less, particularly preferably 5° C. or less. Also, the crystallization degree at 25° C. is preferably 40% or less, particularly preferably 20% or less. When the glass transition temperature and crystallization degree are within said range, the active material is difficult to drop from the collector, and battery properties are small in variability.

Specific examples of the soft polymer include, for example, (a) a single polymer of an acrylic acid or metacrylic acid derivative, or a soft acrylic polymer, i.e. a copolymer of the same and a copolymerizable monomer therewith, such as polybutyl acrylate, polybutyl metacrylate, polyhydroxyethyl metacrylate, polyacrylamide, polyacrylonitrile, butyl acrylate-styrene copolymer, butyl acrylate-acrylonitrile copolymer and butyl acrylate-acrylonitrile-glycidyl metacrylate copolymer; (b) a single polymer of an isobutylene, or an isobutylene-based soft polymer, i.e. a copolymer of the same and a copolymerizable monomer therewith, such as polyisobutylene, isobutylene-isoprene rubber and isobutylene-styrene copolymer; (c) a single polymer of a diene compound, or a diene-based soft polymer, i.e. a copolymer of the same and a copolymerizable monomer therewith, such as polybutadiene, polyisoprene, butadiene-styrene random copolymer, isoprene-styrene random copolymer, acrylonitrile-butadiene copolymer, acrylonitrile-butadiene-styrene copolymer, butadiene-styrene-block copolymer, styrene-butadiene-styrene-block copolymer, isoprene-styrene-block copolymer and styrene-isoprene-styrene-block copolymer; (d) a silicon-containing soft polymer such as dimethyl polysiloxane, diphenyl polysiloxane and dihydroxy polysiloxane; (e) a single polymer of an olefin compound, or an olefinic soft polymer, i.e. a copolymer of the same and a copolymerizable monomer therewith, such as liquid polyethylene, polypropylene, poly-1-butene, ethylene-$\alpha$-olefin copolymer, propylene-$\alpha$-olefin copolymer, ethylene-propylene-diene copolymer (EPDM) and ethylene-propylene-styrene copolymer; (f) a soft polymer comprising unsaturated alcohol and amine or acyl derivative of the same or acetal, such as polyvinyl alcohol, polyvinyl acetate, polyvinyl stearate and vinyl acetate-styrene copolymer; (g) a single polymer of an epoxy compound or an epoxy-based soft polymer, i.e. a copolymer of the same and a copolymerizable monomer therewith, such as polyethylene oxide, polypropylene oxide and epichlorohydrin rubber; (h) a fluorine-containing soft polymer such as vinylidene fluoride-based rubber and ethylene tetrafluoride-propylene rubber; (i) other soft polymers such as natural rubber, polypeptide, protein, polyester-based thermoplastic elastomer, vinyl chloride-based thermoplastic elastomer and polyamide-based thermoplastic elastomer, etc. These soft polymers may have a cross-linking structure, or a functional group introduced by denaturation.

Further, among the above soft polymers, soft polymers (a), (b) and (c) are preferable since they are excellent particularly in retention of the active material, and have excellent flexibility, and (a) is particularly preferable due to excellent oxidation resistance and reduction. Especially, soft polymers having a functional group such as carboxyl group, epoxy group, hydroxyl group, oxy group, ester group, carbonyl oxycarbonyl group, silanol group, silyl group, amino group, nitrile group and sulfo group are preferable since they are excellent in slurry dispersibility of the electrode material mixture, and easy to form the highly-condensed, homogeneous electrode material mixture. Among these, soft polymers having at least one of a nitrile group and sulfo group are particularly preferable since they are excellent in adhesiveness with the collector in addition to said properties. A content of the above functional group in the soft polymer is preferably 0.1 to 40 wt %. Too small content of said functional group results in inferior adhesiveness, and in contrast, too large content results in rigid electrode.

As a method to obtain soft polymers having the above functional group, there may be mentioned methods (1) using a monomer having the above functional group as a monomer; (2) denaturating the polymer by using a compound having a functional group; and (3) using a polymeric initiator having a functional group.

An amount of the polymer used in the present invention is preferably 0.1 to 7 parts by mass, more preferably 0.3 to 5 parts by mass and particularly preferably 0.5 to 3 parts by mass, per 100 parts by mass of the active material. When the amount of the polymer is too small, the active material is liable to easily drop from the electrode, and in contrast, too large amount may cause to cover the active material with the polymer resulting in inhibition of the battery reaction or increase in internal resistance.

The polymer used in the present invention is prepared as a solution or dispersion liquid to obtain the electrode. The viscosity at preparation is normally in the range of 1 mPa·S to 300,000 mPa·S, preferably 50 mPa·S to 10,000 mPa·S. Said viscosity is measured by a B-type viscosimeter at 25° C. at a revolution of 60 rpm. A polymer having a solid content concentration in the range of 8 to 13 mass % when preparing so as to have the above range of viscosity is preferable since it is easy to obtain a uniform and highly-condensed electrode.

(Electrode Material Mixture)

The electrode material mixture used in the present invention includes the active material and the polymer. Normally, the electrode material mixture is prepared as slurry dispersed in a solvent (hereinafter referred to as "electrode material mixture slurry"). As a solvent, any one capable of dissolving or dispersing said polymer in particle state may be usable, and the solvent capable of dissolving the polymer is preferable. When using the solvent capable of dissolving the polymer, the electrode active material, etc., can be stably dispersed because the polymer absorbs onto the surfaces.

As a solvent used in the electrode material mixture slurry, either water or organic solvent can be used. As an organic solvent, there may be mentioned alicyclic hydrocarbons such as cyclopentane and cyclohexane; aromatic hydrocarbons such as toluene and xylene; ketones such as ethyl methyl ketone and cyclohexanone; esters such as ethyl acetate, butyl acetate, $\gamma$-butyrolactone and $\epsilon$-caprolactone; nitriles such as acetonitrile and propionitrile; ethers such as tetrahydrofuran and ethylene glycol diethyl ether; alcohols such as methanol, ethanol, isopropanol, ethylene glycol and ethylene glycol monomethyl ether; amides such as N-methylpyrrolidone, N,N-dimethyl acetamide and N,N-dimethyl formamide; etc. The solvent can be used either alone or in combination of 2 or more.

A method for preparing the electrode material mixture slurry is not particularly limited, and normally, a method using a mixing machine such as ball mill, a sand mill, a pigment disperser, a shaking apparatus, an ultrasonic disperser, a homogenizer, a planetary mixer, a bead mill and a sun-and-planet mixer may be used.

A concentration of the electrode material mixture slurry is not particularly limited, and is preferably 60 mass % to 90 mass % in a volume fraction of a nonvolatile content. When the concentration of the electrode material mixture slurry is within the range, the porosity of the electrode material mixture obtained by coating on the collector and drying can be lowered.

The electrode material mixture used in the present invention preferably includes an electrical conducting material. As an electrical conducting material, a conductive carbon such as acethylene black, ketjen black, carbon black, graphite, vapor-grown carbon fiber and carbon nanotube can be used. By using the electrical conducting material, electric interengagement between the electrode active materials can be increased, and the discharging rate property can be improved when using in a nonaqueous electrolyte secondary battery. Amount of the electrical conducting material used is normally 0 to 20 parts by mass, preferably 1 to 10 parts by mass per 100 parts by mass of the active material.

The electrode material mixture used in the present invention may include an antifoam, viscosity modifier and coupling agent in a range not impairing the effects of the present invention in addition to the above polymer. As an antifoam, metallic soap, polysiloxanes, polyethers, higher alcohols, perfluoroalkyls, etc. can be used. As a viscosity modifier, a variety of surfactants and coupling agents may be mentioned. As a surfactant, a nonionic surfactant such as polyoxyethylene alkyl ether and polyoxyethylene alkyl ester is preferable. As a coupling agent, there may be mentioned a variety of coupling agents such as silane-based, aluminate-based, titanate-based and boron-based coupling agents. As a viscosity modifier and coupling agent, those soluble in the solvent used for preparing the slurry are preferable since they can improve dispersibility of active material and electrical conducting material.

(Collector)

The collector used in the present invention is not particularly limited as long as it is an electrically conductive and electrochemically resistant material, and for example, metallic material such as iron, copper, aluminum, nickel, stainless steel, titanium, tantalum, gold and platinum is preferable because it has heat resistance. Among these, for positive electrode of the nonaqueous electrolyte secondary battery, aluminum is particularly preferable, and for negative electrode, copper is particularly preferable. The shape of the collector is not particularly limited, and the sheeted collector with a thickness of 0.001 to 0.5 mm or so is preferable. It is preferable that the collector is preliminarily roughened before use for improving adhesive strength of the electrode material mixture. A method for roughening includes mechanical method of polishing, electropolishing, chemical polishing, etc. In the mechanical method of polishing, there can be used abrasive cloth paper with abrasive particles fixed thereon, grinding stone, emery buff, wire brush provided with steel wire, etc. Also, to increase the adhesive strength and conductivity of the electrode material mixture, an interlayer may be formed on the surface of the collector.

(Production Method of Electrode)

A production method of the electrode of the present invention, any method, wherein the electrode material mixture is applied to layer on at least one surface of said collector, preferably both surfaces, may be used. For example, a method, wherein said electrode material mixture slurry is applied on the collector and dried by heating to form the electrode material mixture, is preferable. The method for applying the electrode material mixture slurry onto the collector is not particularly limited. For example, there may be mentioned doctor blade method, dip method, reverse roll coating method, direct roll coating method, gravure printing method, extrusion method, brush painting, etc. As a drying method, for example, there may be mentioned drying by warm air, hot air, low wet-air, etc., drying in a vacuum, drying by irradiating (far) infrared rays, electron beam, etc.

Then, by pressure treatment by using a die press tool and a roll press equipment, etc., it is preferable to lower the porosity of the electrode material mixture of the electrode. The preferable range of the porosity is 5% to 15%, more preferably 7% to 13%. Too high porosity causes to deteriorate charging efficiency and discharging efficiency. Too low porosity may cause problems that high volume/capacity is hardly obtained, and that the electrode material mixture is easily peeled to cause defects. Further, when using curable polymer, it is preferable to cure the polymer.

The thickness of the electrode material mixture of the electrode of the present invention is normally 5 μm or more and 300 μm or less, preferably 30 μm or more and 250 μm or less.

The nonaqueous electrolyte secondary battery of the present invention comprises the electrode of the present invention and the electrolyte and separator. The electrode of the present invention may be used for either positive electrode or negative electrode. For better exerting effects of the present invention, it is preferable to use for the thicker one of either positive electrode or negative electrode, and it is further preferable to use for both positive electrode and negative electrode.

(Electrolyte)

The electrolyte used in the present invention is not particularly limited, and for example, an electrolyte, wherein a lithium salt is dissolved as a supporting electrolyte in a non-aqueous solvent, can be used. As a lithium salt, for example, there may be mentioned lithium salts such as $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$ and $(C_2F_5SO_2)NLi$. Particularly, $LiPF_6$, $LiClO_4$ and $CF_3SO_3Li$, which are easily soluble in a solvent and exhibit a high degree of dissociation, may be preferably used. These can be used either alone or in combination of 2 or more. An amount of the supporting electrolyte is normally 1 mass % or more, preferably 5 mass % or more, and normally 30 mass % or less, preferably 20 mass % or less, per the electrolyte. Also, with respect to the electrolyte, a concentration is normally controlled to 0.5 to 2.5 mol/L. When the amount of the supporting electrolyte is either too small or too large, ionic conductivity may be lowered, and charging property and discharging property of the battery may be lowered.

The solvent used for the electrolyte is not particularly limited as long as it is a solvent usable for dissolving the supporting electrolyte therein, and normally, alkyl carbonates such as dimethyl carbonate (DMC), ethylene carbonate (EC), diethyl carbonate (DEC), propylene carbonate (PC), butylene carbonate (BC) and methyl ethyl carbonate (MEC); esters such as γ-butyrolactone and methyl formate; ethers such as 1,2-dimethoxyethane and tetrahydrofuran; sulfur-containing compounds such as sulfolane and dimethyl sulfoxide; can be used. Particularly, dimethyl carbonate, ethylene carbonate, propylene carbonate, diethyl carbonate and methyl ethyl carbonate are preferable since they are easy to obtain high ionic conductivity and broad in a range of operating temperature. These can be used either alone or in combination of 2 or more.

As other electrolytes, there may be mentioned gel polymer electrolyte obtained by impregnating a polymer electrolyte such as polyethylene oxide and polyacrylonitrile with an electrolyte, and inorganic solid electrolyte such as LiI and Li$_3$N.

(Separator)

As a separator, publicly-known separators, including polyolefin, such as polyethylene and polypropylene, microporous membrane or nonwoven fabric; porous resin containing inorganic ceramic powder; etc., can be used.

(Production Method of Battery)

A production method of the nonaqueous electrolyte secondary battery of the present invention is not particularly limited. For example, it can be obtained by superimposing the positive electrode and negative electrode via the separator, winding or bending it in conformity with the battery shape to fit in the battery case, filling the electrolyte in the battery case, and sealing the case. In addition, if needed, an expanded metal, an overcurrent prevention element such as fuse and PTC element, lead board, etc. may be set in to prevent pressure increase in the battery and excess discharge and charge. The shape of the battery may include coin shape, button shape, sheet shape, cylinder shape, square shape and flattened shape.

EXAMPLES

Hereinafter, the present invention will be described based on examples, but the present invention is not limited to these. Note that "part" and % are, unless otherwise particularly noted, mass standard in the present examples.

Binders, electrode compositions, electrodes and batteries obtained in the Examples and Comparative Examples were evaluated according to the following evaluation method.

(Evaluation Method)

<Thickness Change Rate of Electrode Material Mixture>

The produced electrode was punched out in a disk with a diameter of 14 mm to make a test specimen. A thickness of a center portion of the test specimen was measured, and based on the measurement and a preliminarily-measured thickness of the collector, a thickness ($t_0$) of the electrode material mixture was calculated. The test specimen was horizontally immersed in the electrolyte, and left it at rest at 60±1° C. for 72±0.3 hours. The electrolyte was obtained by dissolving LiPF$_6$ in a concentration of 1 mol/L in a solvent wherein ethylene carbonate (EC) and diethyl carbonate (DEC) were mixed in a volume ratio of EC:DEC=1:2 (where volumes of EC and DEC are measured at 40° C. and 20° C., respectively). After the immersion, the specimen was moved into a petri dish in a dry room wherein the dew point was controlled at −54° C., and left it at rest at room temperature for 15 minutes in a horizontal position. After that, the center portion of this test specimen was measured, and based on the measurement and the thickness of the collector, a thickness ($t_1$) of the post-immersed electrode material mixture was calculated. A thickness change rate was obtained by $(t_1-t_0)/t_0 \times 100$. The above test was repeated 10 times to obtain the simple average and standard deviation.

<Stress Relaxation Rate>

20 parts by mass of the polymer was dissolved in 100 parts by mass of N-methyl pyrrolidone (hereinafter may be referred to as "NMP"). The solution was casted on a fluorine resin plate, and dried in a vacuum at 120° C. for 24 hours to obtain a sheeted polymer with a thickness of 1±0.1 mm. The sheeted polymer was punched out in a shape of dumbbell No. 3 prescribed in JIS K6251 to make a test specimen. The test specimen was pulled at 25° C. in the lengthy direction of the test specimen at a speed of 10 mm/minute, and as of attaining the elongation rate of 20%, the elongation was stopped to measure the initial stress $\sigma_0$. Then, the elongation rate was kept at 20% for 10 minutes, and the remaining stress $\sigma_{10}$ was measured, so that the stress relaxation rate, $(1-\sigma_{10}/\sigma_0) \times 100$ (%), was obtained. The measurements were repeated 10 times to obtain the simple average and standard deviation.

<Concentration of Polymer Solution>

The concentration of the polymer solution was obtained by measuring a remaining concentration after heating at 150° C. for 3 hours in accordance with JIS K5400.

<Glass Transition Temperature of Polymer>

The glass transition temperature of the polymer was measured by a differential scanning calorimetry (DSC method) at a temperature rising rate of 5° C./minute.

<Crystallization Degree of Polymer>

The crystallization degree of the polymer was measured by an X-ray diffraction method.

<Porosity of Electrode Material Mixture>

The porosity of the electrode material mixture was obtained in the following method.

A theoretical density "ρ" of the electrode material mixture was obtained from densities and amounts of the materials constituting the electrode material mixture.

The produced electrode was punched out in a disk with a diameter of 14 mm to make a test specimen, and mass of the test specimen and thickness of a center portion of the test specimen were measured. Based on preliminarily measured weight and thickness of the collector, mass "W" and volume "V" of the electrode material mixture were obtained.

The porosity "P" was calculated by the following equation:

$$P(\%) = [(V - W/\rho)/V] \times 100$$

<Defective Fraction at Battery Production>

The batteries, in which the electrode broke or the electrode material mixture peeled off when winding the electrode, were determined as defective. When producing 400 cells, those that had the number of defectives of less than 3 cells were determined as A; those that had the number of defectives of 3 cells or more and less than 5 cells were determined as B; those that had the number of defectives of 5 cells or more and less than 10 cells were determined as C; those that had the number of defectives of 10 cells or more and less than 15 cells were determined as D; and those that had the number of defectives of 15 cells or more were determined as E.

<Variability of Battery Property>

The produced battery was charged at a temperature of 60° C. with constant current at hour rate of 0.5 until 4.2V and then, further charged with constant volume of 4.2V for 2 hours. Then, the battery was discharged with constant current at hour rate of 0.5 until 2.75V. The discharged battery was left at 60° C. for 65 hours, charged at a temperature of 25° C. with constant current at hour rate of 0.5 until 4.2V, and then discharged with constant current at hour rate of 2 until 2.75V. The rate of the discharging capacity at hour rate of 2 to the discharging capacity at hour rate of 0.5 was shown on percentage, which was made as a discharging rate property. When producing 300 cells of batteries for the above test, those that had a difference between the maximum and the minimum values of the discharging rate property of less than 5% were determined as A; those that had the difference of 5% or more and less than 7% were determined as B; those that had the difference of 7% or more and less than 9% were determined as C; those that had the difference of 9% or more and less than 11% were determined as D; and those that had the difference of 11% or more were determined as E.

Example 1

(Production of Polymer)

To an autoclave with stirrer, 300 parts of ion-exchange water, 81.5 parts of n-butyl acrylate, 15 parts of acrylonitrile, 3.0 parts of glycidyl metacrylate, 0.5 part of 2-acrylamide 2-methylpropanesulfonic acid, and 0.05 part of t-dodecyl mercaptan as a molecular weight modifier, and 0.3 part of potassium persulfate as a polymeric initiator were added, sufficiently mixed, and then, polymerized by heating up to 70° C., so that a latex was obtained. The degree of polymerization based on the solid content concentration was approximately 99%. 100 parts of the latex was added with 320 parts of NMP, and the water was evaporated under reduced pressure, so that NMP solution of the polymer for the nonaqueous electrolyte secondary battery electrode of the present invention, i.e. butyl acrylate-acrylonitrile based copolymer (hereinafter referred to as "polymer A", the polymer A having a nitrile group and a sulfo group) was obtained. The concentration of the polymer A solution was 9 mass %, and solution viscosity was 250 mPa·S (B-type viscometer: 25° C., 60 rpm). The stress relaxation rate of the polymer A is shown in Table 1. Also, the glass transition temperature of the polymer was −5° C., the crystallization degree was 0%, and absolute specific gravity was 1.05.

(Production of Positive Electrode)

20 parts of acethylene black and 1,000 parts of $LiCoO_2$ with average particle size of 3.8 μm and tap density of 2.7 g/cm$^3$ were added to a planetary mixer. 133 parts of 9 mass % NMP solution of the polymer A and NMP were further added so as to control the solid content concentration to 81%, followed by mixing at 60 rpm for 60 minutes. Then, NMP was gradually added to have the solid content concentration of 77%, followed by defoaming treatment under reduced pressure, to obtain a shiny electrode material mixture slurry having a high fluidity. The electrode material mixture slurry was applied by a comma coater on both sides of aluminum foil with a thickness of 20 μm so as to have dry thickness of about 110 μm or so, dried at 120° C., and pressed by a roll press so that the density of the electrode material mixture was 3.6×10$^3$ kg/m$^3$, and that porosity was 9.4%. Then, the electrode material mixture was subject to drying treatment at 60° C. for 17 hours under reduced pressure to obtain an electrode for positive electrode. The thickness of the electrode material mixture of the electrode for positive electrode was 85 μm. The evaluation results of the change rate in thickness of the electrode material mixture are shown in Table 1.

(Production of Negative Electrode)

As a negative electrode active material, 98 parts of graphite with particle size of 20 μm and relative surface area of 4.2 m$^2$/g, and 1 part of solid SBR latex (Zeon Corporation, BM400B) as a binder were mixed, further added with 1 part of carboxyl methyl cellulose and mixed in a planetary mixer to prepare an electrode composition slurry for negative electrode. The composition for negative electrode was applied on a surface of copper foil with a thickness of 0.1 mm and dried at 120° C. for 3 hours, followed by pressing by a roll, to obtain a negative electrode.

(Production of Battery)

The obtained positive electrode was cut up in a dimension with a width of 54 mm×a length of 480 mm, only the electrode material mixture on one surface was removed up to 10 mm from an end in a lengthy direction to expose the collector, and then, a positive electrode lead was attached thereto. Also, the obtained negative electrode was cut up in a dimension with a width of 56 mm×a length of 510 mm, only the electrode material mixture on one surface was removed up to 10 mm from an end in a lengthy direction to expose the collector, and then, a negative electrode lead was attached thereto. Subsequently, the above positive electrode and negative electrode were placed with a polyethylene separator, which was a continuous madreporic body with a thickness of 20 μm and porosity of 40%, not to shunt both electrodes; winded on a winding core made by SUS with a diameter of 3.5 mm; and installed in a stainless steel cylindrical battery case, which had a base and a dimension with a external diameter of 18 mm and height of 67 mm. Then, a positive electrode lead and positive electrode tab, and negative electrode lead and negative electrode tab were respectively welded. Following this, the battery case was deaerated, an electrolyte was injected thereto, and a sealing plate was placed, so that a cylindrical lithium ion secondary battery was produced. Note that the electrolyte was obtained by dissolving $LiPF_6$ in a concentration of 1 mol/L in a mixed solvent of ethylene carbonate (EC) and diethyl carbonate (DEC) in a volume ratio of EC:DEC=1:2 (where volumes of EC and DEC were measured at 40° C. and 20° C., respectively). Evaluation results of variability of the obtained battery property are shown in Table 1.

Example 2

Except for using 2-ethylhexyl acrylate instead of n-butyl acrylate used in Example 1, and 0.09 part of t-dodecyl mercaptan as a molecular weight modifier, polymer B was obtained in the same way as in Example 1. The solution viscosity of the polymer B was 82 mPa·S (B-type viscosimeter: 25° C., 60 rpm). The stress relaxation rate of the polymer B is shown in Table 1. Also, the glass transition temperature of the polymer was −12° C., and the crystallization degree was 0%. Production of electrodes and battery were performed as in Example 1. The porosity of the electrode material mixture was 9.1%. The thickness change rate of the obtained electrode material mixture and variability of battery property were evaluated, and results are shown in Table 1.

Example 3

Except for using 0.02 part of t-dodecyl mercaptan as a molecular weight modifier, polymer C was obtained in the same way as in Example 1. The solution viscosity of the polymer C was 627 mPa·S (B-type viscosimeter: 25° C., 60 rpm). The stress relaxation rate of the polymer C is shown in Table 1. Also, the glass transition temperature of the polymer was −5° C., and the crystallization degree was 0%. Production of electrodes and battery were performed as in Example 1. The porosity of the electrode material mixture was 10.1%. The thickness change rate of the obtained electrode material mixture and variability of battery property were evaluated, and results are shown in Table 1.

Comparative Example 1

Except for not using t-dodecyl mercaptan used in Example 1 as the molecular weight modifier, polymer D was obtained in the same way as in Example 1. The solution viscosity of the polymer D was 1,460 mPa·S (B-type viscosimeter: 25° C., 60 rpm). The stress relaxation rate of the polymer D is shown in Table 1. Also, glass transition temperature of the polymer was −5° C., and the crystallization degree was 0%. Production of electrodes and battery were performed as in Example 1. The porosity of the electrode material mixture was 12.8%. The thickness change rate of the obtained electrode material mixture and variability of battery property were evaluated, and results are shown in Table 1.

Comparative Example 2

Except for using PVDF (made by KUREHA CORPORATION, KF1300) as a polymer, the same procedures were taken as in Example 1. The stress relaxation rate of PVDF is shown in Table 1. Also, the glass transition temperature of the polymer was −40° C., and the crystallization degree was 40%. Production of electrodes and battery were performed as in Example 1. The porosity of the electrode material mixture was 11.9%. The thickness change rate of the obtained electrode material mixture and variability of battery property were evaluated, and results are shown in Table 1.

Comparative Example 3

Except for using 0.15 part of t-dodecyl mercaptan as a molecular weight modifier, and not using 3.0 parts of glycidyl methacrylate used in Example 1, polymer E was obtained in the same way as in Example 1. The solution viscosity of the polymer E was 25 mPa·S (B-type viscosimeter: 25° C., 60 rpm). The stress relaxation rate of the polymer E is shown in Table 1. Also, the glass transition temperature of the polymer was −5° C., and the crystallization degree was 0%. Production of electrodes and battery were performed as in Example 1. The porosity of the electrode material mixture was 8.5%. The thickness change rate of the obtained electrode material mixture and variability of battery property were evaluated, and results are shown in Table 1.

Example 4

Except for using 27 parts of styrene and 73 parts of isoprene, instead of 81.5 parts of n-butyl acrylate, 15 parts of acrylonitrile and 3.0 parts of glycidyl methacrylate used in Example 1, polymer F was obtained in the same way as in Example 1. The solution viscosity of the polymer F was 5,700 mPa·S (B-type viscosimeter: 25° C., 60 rpm). The stress relaxation rate of the polymer F is shown in Table 1. Also, the glass transition temperature of the polymer was −14° C., and the crystallization degree was 0%. Production of electrodes and battery were performed as in Example 1. The porosity of the electrode material mixture was 9.5%. The thickness change rate of the obtained electrode material mixture and variability of battery property were evaluated, and results are shown in Table 1.

Example 5

Except for using 22 parts of styrene, 66 parts of isoprene and 12 parts of acrylonitrile instead of 81.5 parts of n-butyl acrylate, 15 parts of acrylonitrile and 3.0 parts of glycidyl methacrylate used in Example 1, polymer G was obtained in the same way as in Example 1. The solution viscosity of the polymer G was 6,800 mPa·S (B-type viscosimeter: 25° C., 60 rpm). The stress relaxation rate of the polymer G is shown in Table 1. Also, the glass transition temperature of the polymer was 4° C., and the crystallization degree was 0%. Production of electrodes and battery were performed as in Example 1. The porosity of the electrode material mixture was 10.1%. The thickness change rate of the obtained electrode material mixture and variability of battery property were evaluated, and results are shown in Table 1.

According to the results shown in Table 1, the batteries of the present invention show small variability in battery property. On the other hand, Comparative Examples show large variability in battery property, and the results are inferior.

TABLE 1

| | | Example 1 | Example 2 | Example 3 | Comparative Example 1 | Comparative Example 2 | Comparative Example 3 | Example 4 | Example 5 |
|---|---|---|---|---|---|---|---|---|---|
| Polymer | | Polymer A | Polymer B | Polymer C | Polymer D | PVDF | Polymer E | Polymer F | Polymer G |
| Thickness Change Rate of Compounding Agent | Average (%) | 6 | 0.2 | 8.4 | 13 | 14 | −3.5 | −2 | 4.2 |
| | Standard Deviation | 0.04 | 0.03 | 0.04 | 0.04 | 0.03 | 0.03 | 0.04 | 0.02 |
| Stress Relaxation Rate | Average (%) | 58.7 | 75.1 | 52.1 | 41.2 | 36.3 | 92.1 | 77.8 | 65.2 |
| | Standard Deviation | 0.15 | 0.19 | 0.16 | 0.19 | 0.18 | 0.19 | 0.15 | 0.19 |
| Variability of Battery Property | | A | B | B | D | E | E | B | B |
| Defective Fraction at Battery Production | | A | C | C | A | E | D | D | D |

The invention claimed is:

1. A nonaqueous electrolyte secondary battery comprising an electrode comprising an electrode material mixture, including an active material and a polymer, and a current collector, wherein the polymer includes a nitrile group and a glycidyl group; and wherein a thickness change rate of the electrode material mixture is −3 to 10% when immersing it in an electrolyte at 60° C. for 72 hours, wherein said polymer is a soft polymer, which has a glass transition temperature of 30° C. or less as measured by differential scanning calorimetry, and wherein said electrode material mixture includes said polymer in a range of 0.1 to 7 parts by mass per 100 parts by mass of said active material.

2. The nonaqueous electrolyte secondary battery as set forth in claim 1, wherein a stress relaxation rate of said polymer indicated as a formula, $(1-\sigma_{10}/\sigma_0) \times 100$ (%), is 50 to 80%.

3. The nonaqueous electrolyte secondary battery as set forth in claim 1, wherein said soft polymer is an acrylic polymer.

4. The nonaqueous electrolyte secondary battery as set forth in claim 1, wherein said soft polymer includes a sulfo group.

* * * * *